No. 811,053. PATENTED JAN. 30, 1906.
D. N. GIFFORD & J. HALL.
APPARATUS FOR AERATING, PURIFYING, AND COOLING MILK.
APPLICATION FILED FEB. 1, 1905.
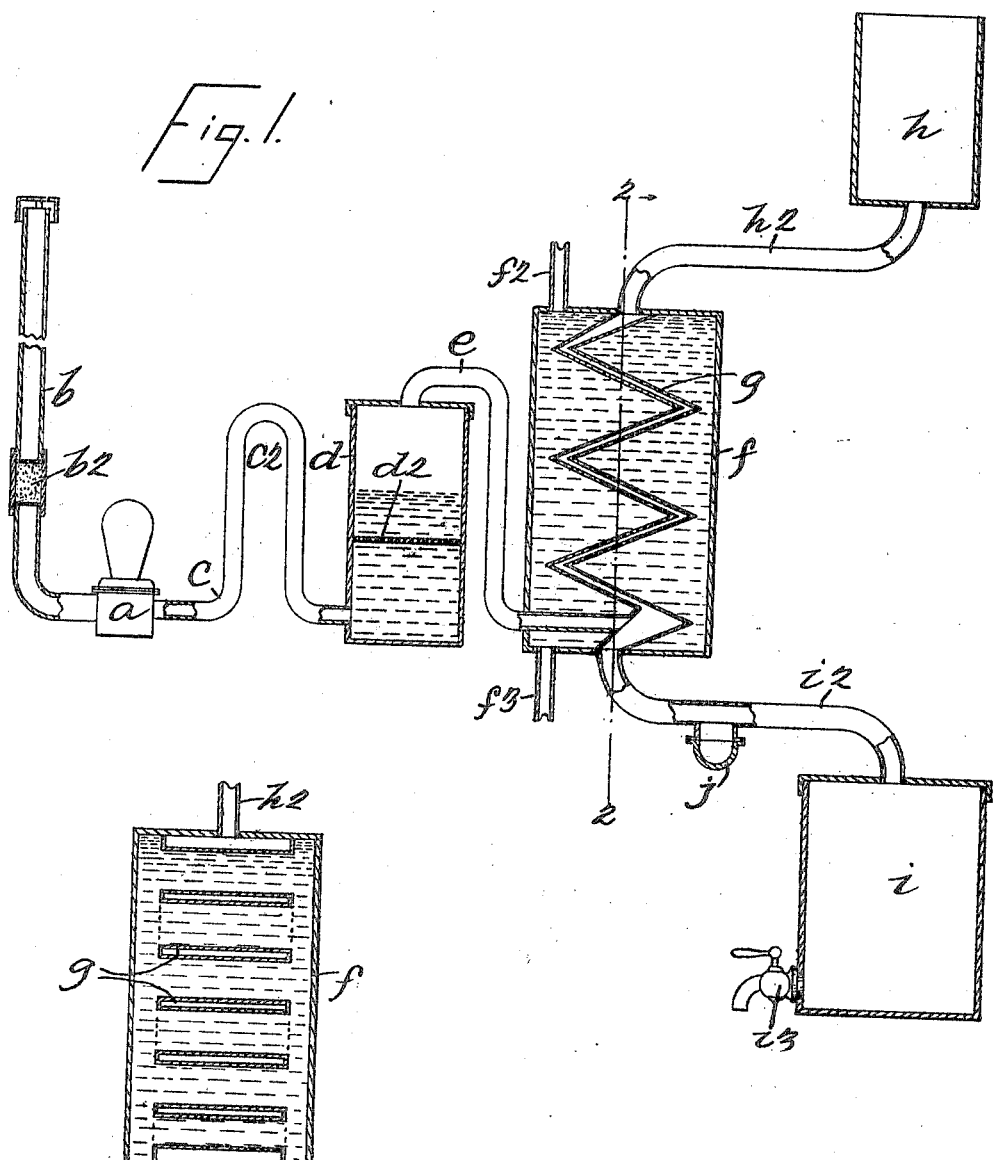
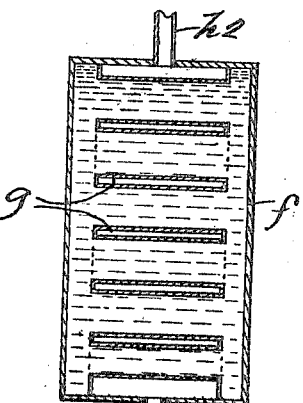
WITNESSES
INVENTORS
Dexter N. Gifford
James Hall
ATTORNEYS

UNITED STATES PATENT OFFICE.

DEXTER N. GIFFORD AND JAMES HALL, OF BROOKLYN, NEW YORK.

APPARATUS FOR AERATING, PURIFYING, AND COOLING MILK.

No. 811,053.     Specification of Letters Patent.     Patented Jan. 30, 1906.

Application filed February 1, 1905. Serial No. 243,668.

*To all whom it may concern:*

Be it known that we, DEXTER N. GIFFORD and JAMES HALL, citizens of the United States, residing at Brooklyn, in the county of Kings and State of New York, have invented certain new and useful Improvements in Apparatus for Aerating, Purifying, and Cooling Milk, of which the following is a specification, such as will enable those skilled in the art to which it appertains to make and use the same.

This invention relates to apparatus for aerating, purifying, and cooling milk; and the object of the invention is to provide an improved apparatus of this class which is simple in construction and operation and comparatively inexpensive and by means of which the milk in addition to being cooled and aerated is also thoroughly purified and all animal taste or odor removed therefrom.

The invention is fully disclosed in the following specification, of which the accompanying drawings form a part, in which the separate parts of our improvement are designated by suitable reference characters in each of the views, and in which—

Figure 1 is a diagrammatical side view of the apparatus which we employ, and Fig. 2 a section on the line 2 2 of Fig. 1.

In the practice of our invention we provide an ordinary air-pump $a$, with one side of which is connected an upright pipe $b$, which is preferably of considerable height in order that pure air may be supplied to our improved apparatus, said pipe being preferably of from twenty to fifty feet high, according to location of the apparatus, and placed in this pipe, preferably at or near the bottom portion thereof, is an air-strainer $b^2$.

Connected with the opposite side of the pump $a$ is a pipe $c$, which is also connected with a water-tank $d$ at or near the bottom portion of said tank, and the pipe $c$ is preferably provided between the tank $d$ and the pump $a$ with an upwardly-directed bend or loop $c^2$, which extends above the height of the water in the tank $d$, and said tank is also provided, preferably centrally thereof or below the center thereof, with a transverse perforated plate $d^2$.

Connected with the top portion of the tank $d$ is a pipe $e$, and arranged adjacent to the tank $d$ is a cooler $f$, comprising a tank of suitable dimensions and considerable height, and the tank $f$ is provided with a water-inlet pipe pipe $f^2$ and a water-outlet pipe $f^3$.

Arranged vertically in the tank or cooler $f$ is a zigzag passage $g$, which in the form of construction shown is composed of a flattened tube, said tube being flattened so as to provide a wide narrow passage therethrough; but said zigzag passage may be formed in other ways and may consist of parallel inclined plates secured to the opposite sides of the tank $f$.

Arranged adjacent to and over the tank or cooler $f$ is a milk-supply tank $h$, and arranged adjacent to and below the tank or cooler $f$ is a milk-receiver tank $i$, and the milk-supply tank $h$ is connected with the upper end of the zigzag passage $g$ by a tube $h^2$, while the milk-receiver tank $i$ is connected with the lower end of said passage by a pipe $i^2$, in which is preferably placed a trap $j$.

The tube $e$, which is connected with the water-tank $d$ in the form of construction shown passes laterally into the bottom of the cooler $f$ and communicates with the bottom leg of the zigzag passage $g$, and this connection is so made that milk in passing through the passage will not flow into the tube $e$. The zigzag passage $g$ is so formed that the milk in passing therethrough will flow off or over the corners thereof at the angles of each bend thereof, and this formation of said passage facilitates the operation of the apparatus, as hereinafter described.

In practice the tank $f$ is filled with cold water, which is supplied thereto by the pipe $f^2$, and said water may be drawn off whenever desired through the pipe $f^3$, and the flow of water into and from said pipe may be made continuous, if desired, and the pipes $f^2$ and $f^3$ will in practice be provided with valves in the usual manner to control the flow of water therethrough.

The milk-supply tank $h$ may be of any desired shape, size, or capacity, and the pipe $h^2$ may be provided, if desired, with a valve in the ordinary manner.

In the operation of the apparatus the milk is poured into the tank $h$ and flows through the pipe $h^2$ into the cooler or into and through the zigzag passage $g$, which forms a part of the cooler, and out through the pipe $i^2$ into the milk-receiver tank $i$, from which it may be drawn through a faucet $i^3$. When the milk is placed in the tank $h$ or prior thereto, the pump $a$ is also put in operation, and the air supplied to the pump through the pipe $b$ is forced through the pipe $c^2$ into the bottom of the water-tank $d$ and passes upwardly through the water therein and through the perforated plate $d^2$ and through the pipe $e$ into the bottom portion of the zigzag passage $g$ and up through the said passage $g$, and in the form of construction shown this air also passes through the tube $h^2$ into the tank $h$ and up through the milk in said tank. It will thus be seen that when the milk is passing through the zigzag passage $g$ in the downward direction the air is passed upwardly through said passage, and the form of said passage is such that the air is passed through the milk at the corners or bends in the zigzag passage, and in this way the milk is thoroughly aerated and purified, and at the same time the milk is thoroughly cooled, the cooling being accomplished both by the air and by the cold water in the cooler or tank $f$, and the water supplied to the tank $d$ may also be cooled or kept cold in any desired manner.

Our improved method of and apparatus for treating milk in addition to cooling and aerating the milk also thoroughly purifies the milk and removes therefrom any animal taste or odor that the milk may possess, and milk treated in this manner will keep longer or remain sweet longer than when treated by the usual method or by ordinary forms of apparatus.

Having fully described our invention, what we claim as new, and desire to secure by Letters Patent, is—

1. In an apparatus for treating milk in the manner described, a closed cooler-tank provided with an inclosed zigzag passage which extends therethrough, a water-tank arranged adjacent to the cooler-tank and the top portion of which is in communication with one end of said passage, an air-pump in communication with the bottom of the water-tank and an air-supply tube in communication with said pump, substantially as shown and described.

2. In an apparatus for treating milk in the manner described, a closed cooler-tank provided with an inclosed zigzag passage which extends therethrough, a water-tank arranged adjacent to the cooler-tank and the top portion of which is in communication with one end of said passage, an air-pump in communication with the bottom of the water-tank and an air-supply tube in communication with said pump, said air-supply tube being also provided with means for purifying air, supstantially as shown and described.

In testimony that we claim the foregoing as our invention we have signed our names, in presence of the subscribing witnesses, this 31st day of January, 1905.

DEXTER N. GIFFORD.
JAMES HALL.

Witnesses:
CHARLES JACHENS,
GEORGE TERPENING.